United States Patent [19]

Walden et al.

[11] Patent Number: 5,321,333
[45] Date of Patent: Jun. 14, 1994

[54] TORSIONAL SHEAR WAVE TRANSDUCER

[75] Inventors: Alan K. Walden, Winter Park; Thomas R. Howarth, Orlando, both of Fla.

[73] Assignee: The United States of America as represented by the Secretary of the Navy, Washington, D.C.

[21] Appl. No.: 43,641

[22] Filed: Apr. 6, 1993

[51] Int. Cl.⁵ .......................... G01S 1/74; H01L 41/04
[52] U.S. Cl. ..................................... 310/333; 310/318; 310/328; 367/158; 367/159
[58] Field of Search ............... 310/318, 328, 333, 334, 310/358; 367/157–159

[56] References Cited

U.S. PATENT DOCUMENTS

| | | | |
|---|---|---|---|
| 3,199,071 | 8/1965 | Massa | 367/158 |
| 3,284,727 | 11/1966 | Carlson et al. | 310/358 |
| 3,506,858 | 4/1970 | Shaw | 310/333 |
| 3,584,243 | 6/1971 | Fabian | 310/333 |
| 3,727,084 | 4/1973 | Epstein | 310/329 |
| 3,842,294 | 10/1974 | Doi et al. | 310/321 |
| 3,947,802 | 3/1976 | Tims et al. | 367/159 |
| 4,072,871 | 2/1978 | Wilson | 310/333 |
| 4,081,784 | 3/1978 | Wilson et al. | 367/159 |
| 4,245,172 | 1/1981 | Shirley | 310/332 |
| 4,336,719 | 6/1982 | Lynnworth | 73/861.27 |
| 4,984,652 | 1/1991 | Batale et al. | 181/104 |
| 5,159,226 | 10/1992 | Montgomery | 310/333 |
| 5,166,907 | 11/1992 | Newnham et al. | 367/157 |
| 5,166,908 | 11/1992 | Montgomery et al. | 310/328 |
| 5,200,666 | 4/1993 | Walter et al. | 310/328 |
| 5,229,980 | 7/1993 | Pawela | 367/157 |

FOREIGN PATENT DOCUMENTS

| | | | |
|---|---|---|---|
| 2219735 | 1/1973 | Fed. Rep. of Germany | 310/333 |
| 4004771 | 1/1992 | Japan | 310/333 |
| 4008179 | 1/1992 | Japan | 310/333 |

OTHER PUBLICATIONS

J. A. Dorn, Radiation Patterns of Torsionally Vibrating Seismic Sources, Geophysics, 49 (8), 1213 (1984).
I. J. Won and J. W. Clough, A New Torsional Shear-Wave Generator, Geophysics, 46, 1607 (1981).
J. K. Applegate, A Torsional Seismic Source, Ph.D. thesis, Colorado School of Mines 1974, pp. 3–68.
Physical Acoustics (W. P. Mason, ed.) (Bell Labs, Murray Hill, N.J. 1964), 308, 429–432.
Piezoelectoric Technology Data for Designers, (Morgan Matroc, Inc. Vernitron Div., Bedford, Ohio.
D. J. Shirley, An Improved Shear Wave Transducer, J. Acoust. Soc. Am., 63(5), 1643 (May, 1978).
Abstract 8UW9 of Walden and Howarth, J. Acoustical Soc. Am., 91, 2463 (No. 4, Pt. 2, Apr., 1992).
Letter from Ellen Le Pernc of the Acoustical Society of America dated Mar. 1, 1993.

Primary Examiner—Thomas M. Dougherty
Attorney, Agent, or Firm—Thomas E. McDonnell; Edward F. Miles

[57] ABSTRACT

A low frequency torsional transducer for the generation and/or reception of shear waves in a substantially solid medium. The transducer includes a spool like radiating structure to which are fixedly attached spaced piezoelectric elements. The elements undergo shear movement upon being electrically excited or upon receiving shear waves. This shear movement causes the opposite ends of the radiating structure to move torsionally. The torsional movement causes radiation of shear waves which can be detected by a sensor and used to determine the degree of support for shear wave propagation in the media.

22 Claims, 4 Drawing Sheets

TORSIONAL SHEAR WAVE TRANSDUCER

BACKGROUND OF THE INVENTION

1. Field of the Invention

The present invention relates to a piezoelectric transducer and, more particularly, to a low frequency transducer for the generation and/or reception of torsional shear waves.

2. Description of the Related Art

Shear waves are transversely propagating waves that can only be supported in an elastic media. Examples of such media are solid and semisolid materials, such as ocean floor sediment. Water does not support the propagation of shear waves because it is a fluid.

In geological surveying and ocean bottom profiling, among other fields, there is a need for measuring the degrees of support and energy dispersion for shear wave propagation. In particular there is a need to measure the sound speed and attenuation of shear-wave propagation in the media at sonar frequencies. The information provided by these measurements can result in improved understanding of a media. This is particularly important for low frequency propagation and the effects that the media can introduce to the propagation and acoustic wave energy.

More particularly, improved sonar equipment can be developed if it is more accurately known how shear waves move through sediment. Further, oil exploration efforts can better locate shale deposits and oil if shear wave movement can be more fully qualified. Also, it is beneficial to be able to monitor shear wave movement through ocean sediment after an earthquake on the ocean floor. It is also desired to detect to extent of shear wave propagation caused by underwater explosions.

The present technique for measuring geo-acoustic properties has been shear wave generation resulting from underwater explosions. This technique is costly and has significant environmental drawbacks. Also, it is difficult to obtain repeatable results or quantitative and qualitative studies.

Other transduction methods have included a bimorph piezoceramic transducer that generates shear waves along a single plane. This type of transducer is quite fragile and is of limited use in low frequency, higher power transmitting applications.

Thus, although means currently exist for measuring the degrees of support for shear wave propagation, they fail to provide the most effective, economical and easy to use transducer. A need therefore exists for an improved shear wave transducer.

SUMMARY OF THE INVENTION

Accordingly, it is a purpose of the present invention to provide a transducer producing torsional shear waves characterized by increased propagation energy and distance.

It is another purpose of the present invention to provide a transducer resulting in a tunable, lower frequency type of shear wave propagation.

It is another purpose of the present invention to provide a transducer that includes a solid interior filler medium, which eliminates dependence on external hydrostatic pressure or temperature conditions.

Finally, it is purpose of the present invention to provide a transducer which can both transmit and receive shear waves in a surrounding medium.

To achieve the foregoing and other purposes of the present invention there is provided a torsional shear wave transducer including a radiating structure and piezoelectric ceramic active driving material. Piezoelectric ceramics are known to respond to shear mechanical deformation when electrically excited or mechanically induced, i.e., these ceramics are reciprocal in nature since they can both transmit and receive shear waves. The radiating structure has a tube and two disks oriented perpendicularly at the ends thereof, and the piezoelectric ceramic material is connected to the radiating structure. The piezoelectric ceramic material may be in the form of, e.g., a pair of spaced rings or a pair of spaced segmented-type structures.

The torsional transducer is preferably encapsulated in a soft polymer that supports elastic wave propagation. A stiffer epoxy material with similar acoustic impedance characteristics to a surrounding medium being studied, such as ocean sediment, covers the encapsulant in a wedge shape for protective purposes and to ease energy coupling from the torsional transducer into the surrounding medium.

Operation of this torsional transducer is based on a high torque being applied by the electromechanical action of driven piezoelectric ceramic material to the spool-like radiating structure. As the piezoelectric ceramic material is excited, a resulting structural torque is coupled through the ends (disks) of the radiating structure, which move in a torsional manner. By torsional it is meant that one disk moves in a first circumferential direction, whereas the other disk moves in a second opposite circumferential direction: the respective movements create helical or twisting movement, as opposed to merely circular movement in parallel planes. The movement of the ends of the radiating structure is translated into the soft polymer encapsulant, epoxy shell and sediment in the form of propagating torsional shear waves.

Through proper dimensional design of the radiating structure, e.g., size, material, thickness, spacing of disks, etc., maximum radiation of shear waves and desired frequencies can be obtained. For example, more mass and larger structural size equates to a lower frequency.

Because this transducer operates with shear displacements in two planes (shear horizontal and shear vertical), the propagating wave results in an increase of energy and distance. The use of the tube results in a lower frequency (increased compliance) and higher amplitude type of shear wave propagation. This advantage is of particular importance when considering that many bottom sediment interests are for the sonar frequencies. The performance of this transducer also should not be dependent on external hydrostatic pressure or temperature conditions because the encapsulant used as an interior filler medium is a solid material. The performance of the transducer according to the present invention should actually improve with depth; the higher the pressure the better, because of the increased energy coupling from the transducer to the medium. Another advantage of this transducer is that its operation is reversible; it can both transmit and receive waves in the surrounding medium.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

DETAILED DESCRIPTION OF THE PREFERRED EMBODIMENTS

Figure 1:
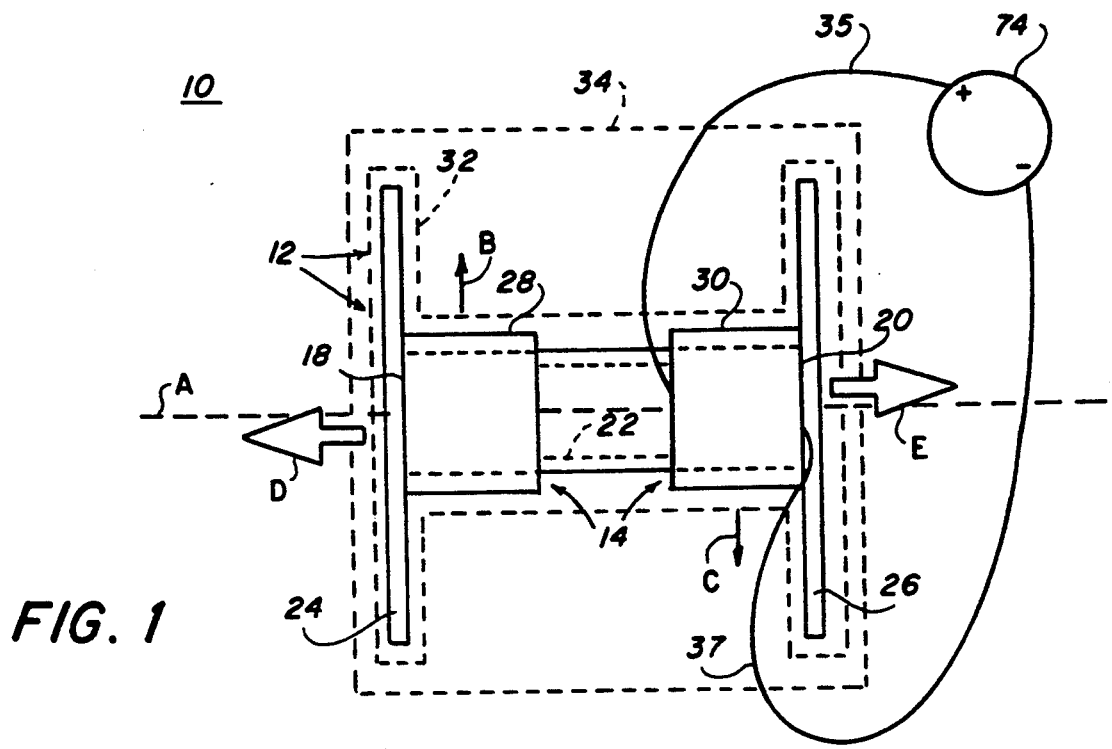
FIG. 1 is a side view of a ring-type torsional transducer according to a first embodiment of the present invention.

The torsional shear wave transducer according to the present invention will now be described in detail with reference to FIGS. 1-7.

The torsional transducer, denominated generally by reference numeral 10, basically includes a radiating structure 12 and piezoelectric ceramic arrangement means 14 connected thereto for undergoing shear movement and causing the transducer 10 to experience torsional movement. The piezoelectric ceramic arrangement means may be, e.g., a ring or a segmented-type structure, as described below.

Figure 2:
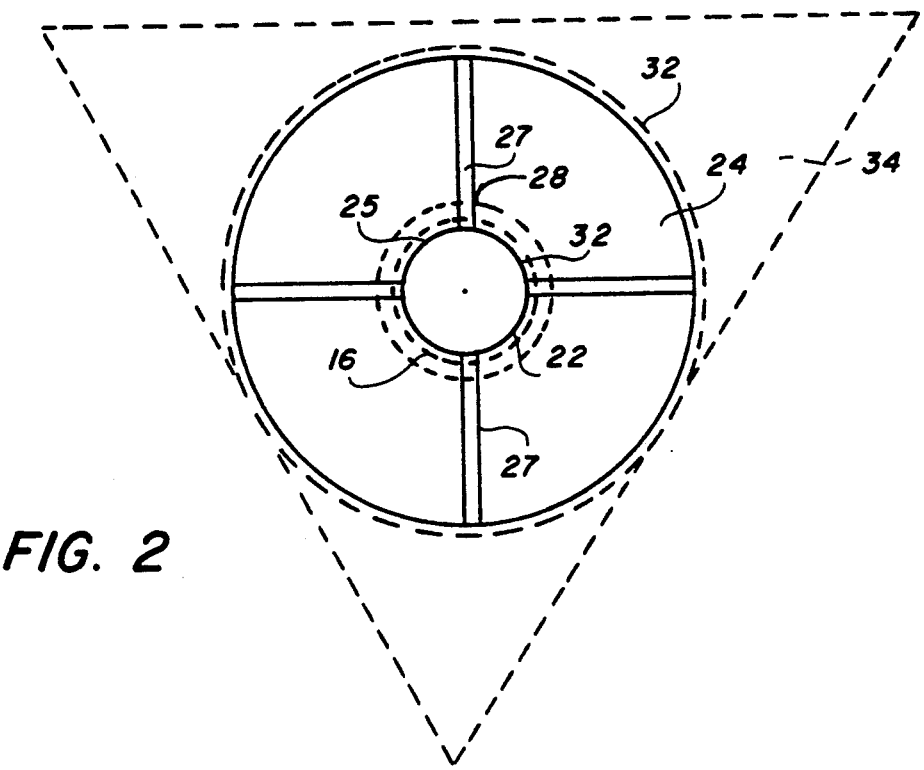
FIG. 2 is a front view of the transducer shown in FIG. 1.

FIG. 1 is a side view and FIG. 2 is a front view, respectively, of a first embodiment of the torsional transducer 10 of the present invention incorporating a ring-type structure for the piezoelectric ceramic arrangement means 14.

In this embodiment, the radiating structure 12 includes an inner radiating cylinder or tube 16 having a first end 18 and a second end 20 along its axis A.

Preferably, the inner radiating tube 16 includes a hollow core 22, but the tube 16 could be solid if desired. If hollow, the inner diameter of the core 22 is formed to effect the desired frequency of operation. The larger this diameter, the lower the frequency of propagation. This dimension depends upon the absence of bending and flexural vibrations and the total torsional transducer 10 package size.

Fixedly connected at the first end 18 is a separate first outer radiating disk 24 which is a planar circular member. The first disk 24 is oriented perpendicularly to the axis A of the radiating structure 12. Similarly, connected perpendicularly at the second end 20 is a second outer radiating disk 26 which is also a planar circular member.

The disks 24, 26 can have a central opening 25 which corresponds to the diameter of the hollow core 22 of the tube 16, as shown in FIG. 2, or each disk 24, 26 can be a continuous member.

These disks 24, 26 are rigidly attached to the tube 16 (or are part of a singular machined structure including the disks 24 and 26) to increase the radiating surface area of the radiating structure 12. As can be seen in FIG. 2, grooves 27 (or a sand blasted outer cross-sectional area) can be formed on the outer periphery of the disks 24, 26, to further increase the surface coupling with the surrounding media.

It is generally preferred to machine a single block of material to form the radiating structure 12 and minimize any compliance mismatch between the tube 16 and the radiating disk 24, 26. However, where a one-piece radiating structure 16 is used, the second embodiment of the invention described below, i.e. the segmented-type piezoelectric ceramic arrangement means 14 is required, since the ring-type piezoelectric ceramic arrangement means 14 of the first embodiment could not be slipped onto the hollow tube 16 past either integral outer disk 24, 26.

The transducer 10 according to the first embodiment would be assembled as follows. The rings 28, 30 would be slipped onto and rigidly bonded to the tube 16. The tube 16, if hollow, would be filled with an elastomer encapsulant 32 described below. The disks 24, 26 would be rigidly bonded to the respective ends 18, 20 of the tube 16. Encapsulant 32 would be placed around the transducer 10 and an epoxy shell 34 described below would cover the encapsulant 32.

The spool-like design of the radiating structure 12 is based on maximizing the radiating surface areas without introducing any compressional vibration disturbances. Through the use of different dimensions and configurations of the tube 16 and the outer disks 24, 26, described herein and within the skill of those in the field, maximum radiating areas are configured.

The recommended material for the radiating structure 12 should have an elastic modulus (tension, flexure and compression) on the same order of magnitude as the encapsulant 32 discussed below, as well as the surrounding medium in which the transducer 10 is embedded, such as ocean sediment. A preferred material is 50% glass reinforced polycarbonate, also known as Lexan ®, although the present invention is not to be limited to this material. This material offers the favorable properties of low elastic modulus values, low water absorption and high impact resistance.

Alternatively, while the tube 16 could be made of Lexan ®, the disks 24, 26 could be made of a polymer such as a polyurethane having the same impedance (acoustic match) as the sediment. This arrangement, however, can introduce energy loss at the respective interfaces.

Also fixedly connected to the radiating structure 12 is the piezoelectric ceramic arrangement means 14. In this first embodiment, this means is in the form of a pair of piezoelectric ceramic rings 28, 30, preferably made of lead zirconate titanate, such as PZT-7 sold by Vernatron. The rings 28, 30, are either rigidly industrial standardized bonded to the inner radiating tube 16 or to the disks 24, 26. An epoxy can be used to connect the piezoelectric ceramic arrangement means 14. An example of the epoxy is sold under the trademark Spurr's epoxy, but almost any epoxy will suffice as long as it forms a rigid bond.

The direction of polarization of the rings 28, 30 is indicated by arrows "B" and "C" in FIG. 1. This is in contrast to the torsional shear wave propagation directions shown schematically by arrows "D" and "E".

Figure 3:
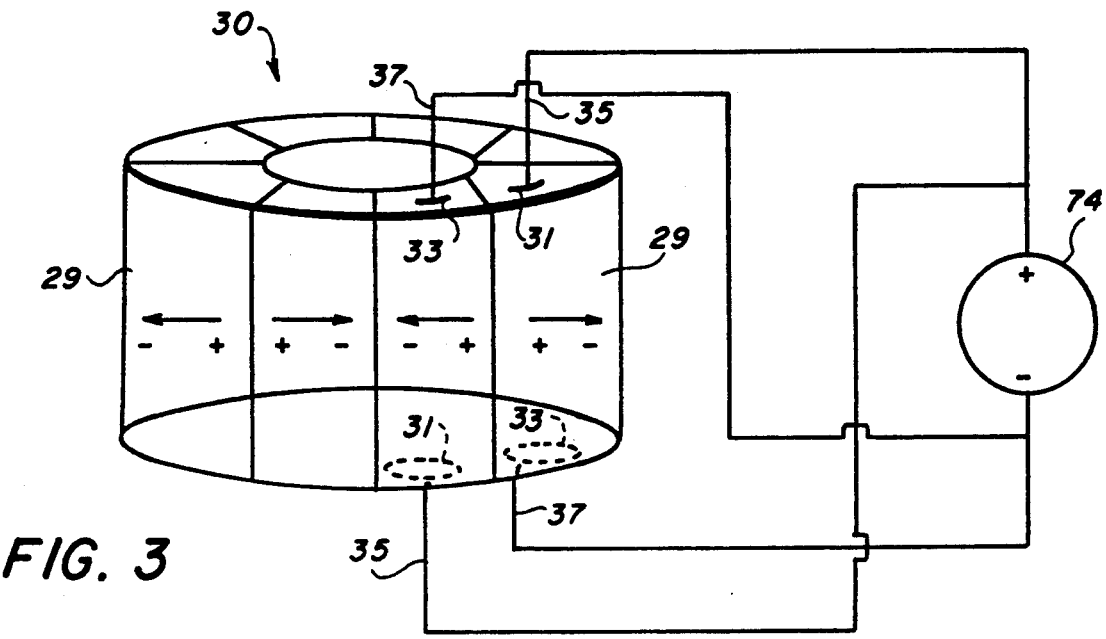
FIG. 3 is a perspective view of a ring-type piezoelectric ceramic arrangement used in the first embodiment.

The rings 28, 30, can be solid members as shown in FIG. 1, or alternatively can be formed of abutting segments 29 as shown in FIG. 3.

In this first embodiment of the piezoelectric ceramic arrangement means 14, i.e. the ring structure, striping or painted electrodes 31, 33, are placed on the sides of the rings 28, 30, as shown in FIG. 3. Each ring 28, 30, receives electrodes, but FIG. 1 only shows the electrodes for ring 30 for clarity. Each electrode 31, 33, is connected to an electronic interface means 74 by electrical connections 35 and 37 respectively.

The placement of the two rings 28, 30 seeks to maximize torque action without introducing any bending action in the structure 12.

If the tube 16 is hollow, the core 22 of the tube 16, the outside of the radiating structure 12 and the piezoelectric ceramic rings 28, 30 can be covered in an elastomer encapsulant 32, e.g. a soft polymer, that supports elastic wave propagation.

A stiffer epoxy type material shell 34 with similar acoustic impedance characteristics to the surrounding sediment can be used to encase the transducer 10 and encapsulant 32 for protective purposes. The outer epoxy shell 34 is shaped into a geometry, such as a wedge, for easy entry into ocean sediment.

The operation of the torsional transducer 10 is based upon a high torque being applied by the electromechanical action of the piezoelectric ceramic arrangement means 14 through the radiating structure 12. As the piezoelectric ceramic arrangement means 14 are excited, the overall torque is coupled through the inner radiating tube 16 and outer disks 24, 26 into the encapsulant 32, shell 34 and sediment.

More particularly, it is known that piezoelectric ceramics, such as rings 28, 30 herein, can be excited, i.e. driven, by an electronic interface means such as 74. For the ring piezoelectric ceramic arrangement means 14 according to the first embodiment, polarization is in the circumferential direction ("3" direction) and the electric field is applied along the length direction ("1" direction). This gives rise to a strain in the "5" direction as a result of the electro-mechanical coupling, which is dependent on the $d_{15}$ piezoelectric coefficient (note that $g_{15}$, which is basically the reciprocal of $d_{15}$, is the coefficient for receiving). The directions of the polarization and the electric field are reversed for the segmented embodiment described below. In either case, the necessary condition is that the polarization and electric field directions must be orthoganal to result in a shear in the 5 direction. This action causes a torsional motion upon the spool shaped radiating structure 12.

The torsional motion is translated to the surrounding medium in the form of both horizontal shear and vertical shear. The emitted shear is then detected by a sensor as discussed below.

Figure 4:
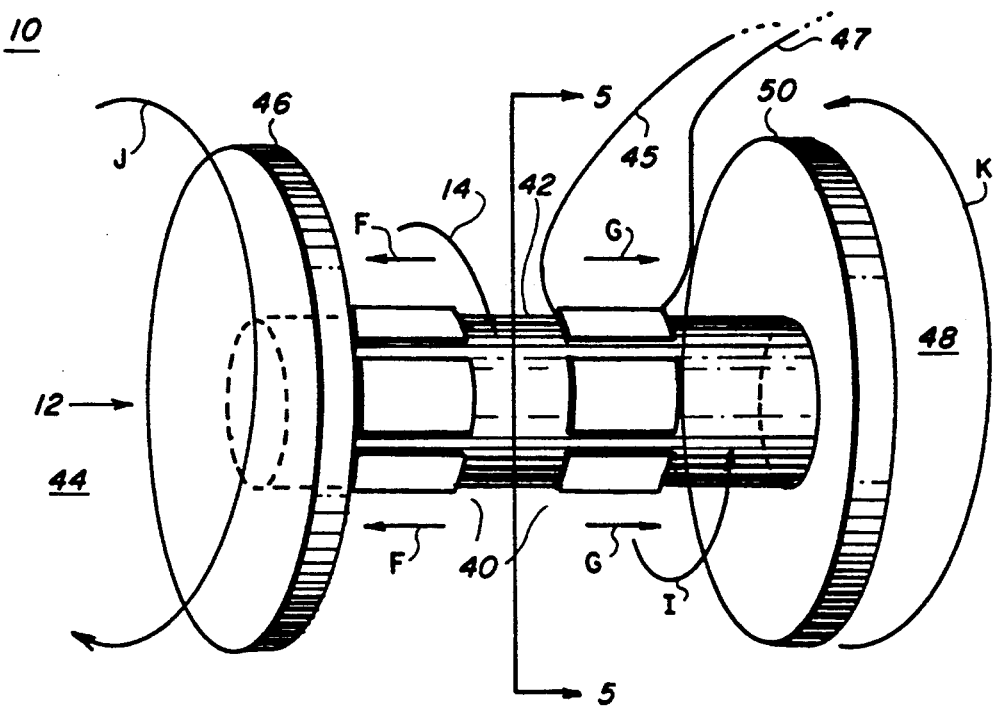
FIG. 4 is a perspective view of a segmented type piezoelectric ceramic arrangement according to a second embodiment of the present invention.
Figure 5:
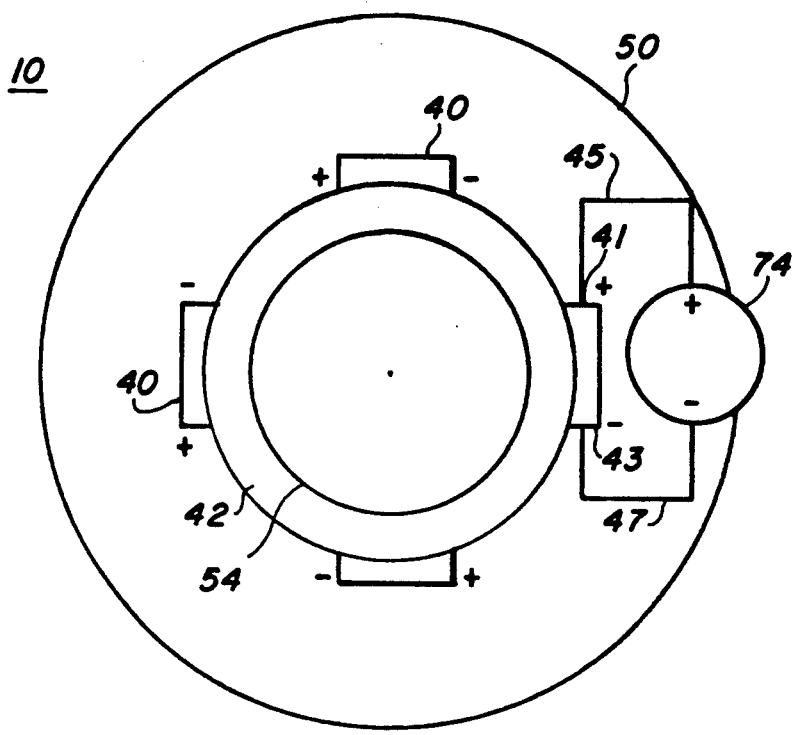
FIG. 5 is a front cross sectional view of the transducer shown in FIG. 4, taken along lines 5—5.

FIG. 4 is a perspective view and FIG. 5 a front cross sectional view, respectively, of the second embodiment of the torsional transducer 10 according to the present invention. This embodiment includes a segmented or "shell" type piezoelectric ceramic arrangement means 14.

In this embodiment, the means 14 is constructed of individual, radially spaced piezoelectric ceramic segments 40 rigidly bonded to an inner radiating tube 42 of the radiating structure 12 or to disks 46, 50 discussed below. Again, the plurality of segments is preferably made of lead zirconate titanate (PZT-7). In practice, these segments 40 may be cut from a piezoelectric ceramic ring.

When segmented piezoelectric ceramic elements are produced, they are polarized by applying electrodes thereto. The electrodes typically remain on the piezoelectric elements when shipped to a customer, so that the customer can attach the ceramics to a proper electronic interface. In the present case, the original polarization electrodes are removed and new electrodes are attached to the piezoelectric ceramic segments 40 for electrically driving same from an electronic interface means 74 discussed below.

As shown in FIGS. 4 and 5, each segment 40 includes an electrode 41, 43 at each side thereof, which is connected to an electrical lead 45, 47, respectively. Only one set of electrodes is illustrated for clarity. The electrodes 41, 43, are connected to the electronic interface means 74 via the leads 45, 47.

In this embodiment, the radiating structure 12 can be either one piece or made up of separate members. As noted above, it is preferred that the structure be machined from a single block of material such as Lexan ®.

Formed perpendicularly at a first end 44 of the tube 42 is a first outer radiating disk 46. Similarly, formed perpendicularly at a second end 48 of the tube 42 is a second radiating disk 50.

As noted above, the direction of polarization of the segments 40 and applied electric field are the opposite of the ring type piezoelectric ceramic arrangement described above. Here the segments 40 are polarized in the length direction ("3") shown by arrows "F" and "G" and the applied field is in the circumferential direction ("1"), shown by arrows "H" and "I". Torsional movement of the disks 46, 50 is shown by arrows "J", "K".

If the tube 42 includes a hollow core 52, this core 52, the outside of the radiating structure 12 and the piezoelectric ceramic segments 40 can again be covered by a soft polymer encapsulant (not shown) that supports elastic wave propagation, just as shown in relation to the first embodiment described above.

A stiffer epoxy type material shell (not shown) with similar acoustic impedance characteristics to the sediment can encase the transducer 10 and encapsulant for protective purposes, just as described above. The outer epoxy shell can again be shaped as a wedge, for easy entry into ocean sediment.

Figure 6:
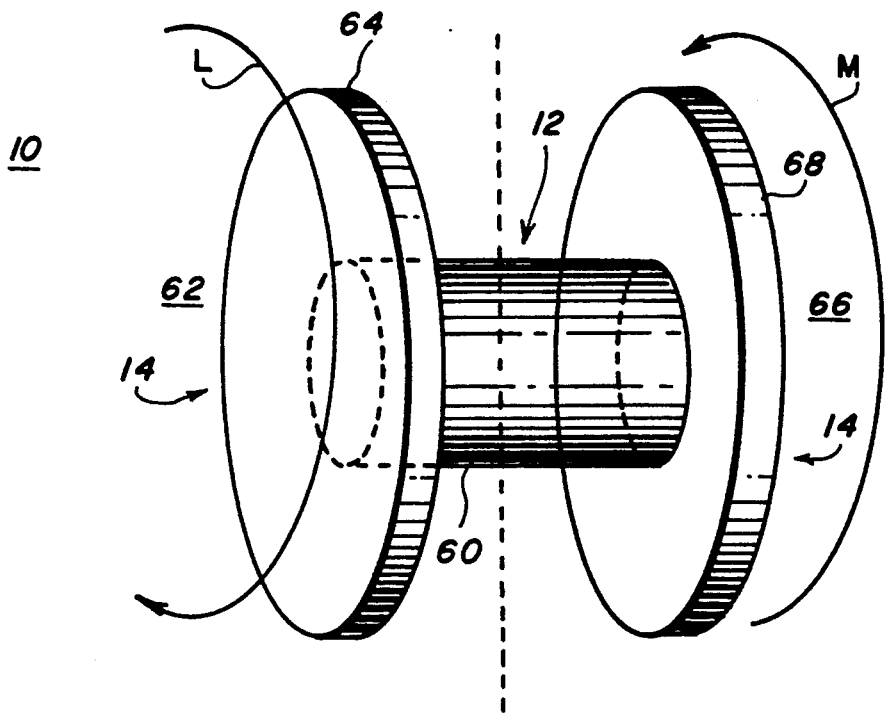
FIG. 6 is a perspective view of a ring type torsional piezoelectric ceramic arrangement according to a third embodiment of the present invention.

In still another embodiment shown in FIG. 6, the piezoelectric ceramic arrangement means 14 acts as the outer disks. In this embodiment the radiating structure 12 can include merely a tube 60, either hollow or not, as desired.

Alternatively, the connection between the two piezoelectric ceramic arrangement means 14 could merely be an elastomer. However, in this alternative, the ability to tune the transducer 10 to a particular frequency is substantially lost.

As shown in FIG. 6, rigidly attached to a first end 62 of the tube 60 is a piezoelectric ceramic arrangement means 14 in the form of a first ring 64. Similarly, attached to a second end 66 of the tube 60 is a second ring 68. The electrodes leading to a driver have been deleted for clarity. Again, the entire transducer 10 can be covered in soft polymer encapsulant and a stiffer epoxy, (not shown).

In comparison with the embodiments described above, no separate Lexan ® disks are used in this embodiment. Instead, when the rings 64 and 68 are driven, torsional movement occurs along arrows "L" and "M" and shear waves are generated directly by the rings 64 and 68.

This alternate embodiment should result in a very high torque transducer, but it may be limited in performance because of the extra weight placed upon the structure.

Figure 7:
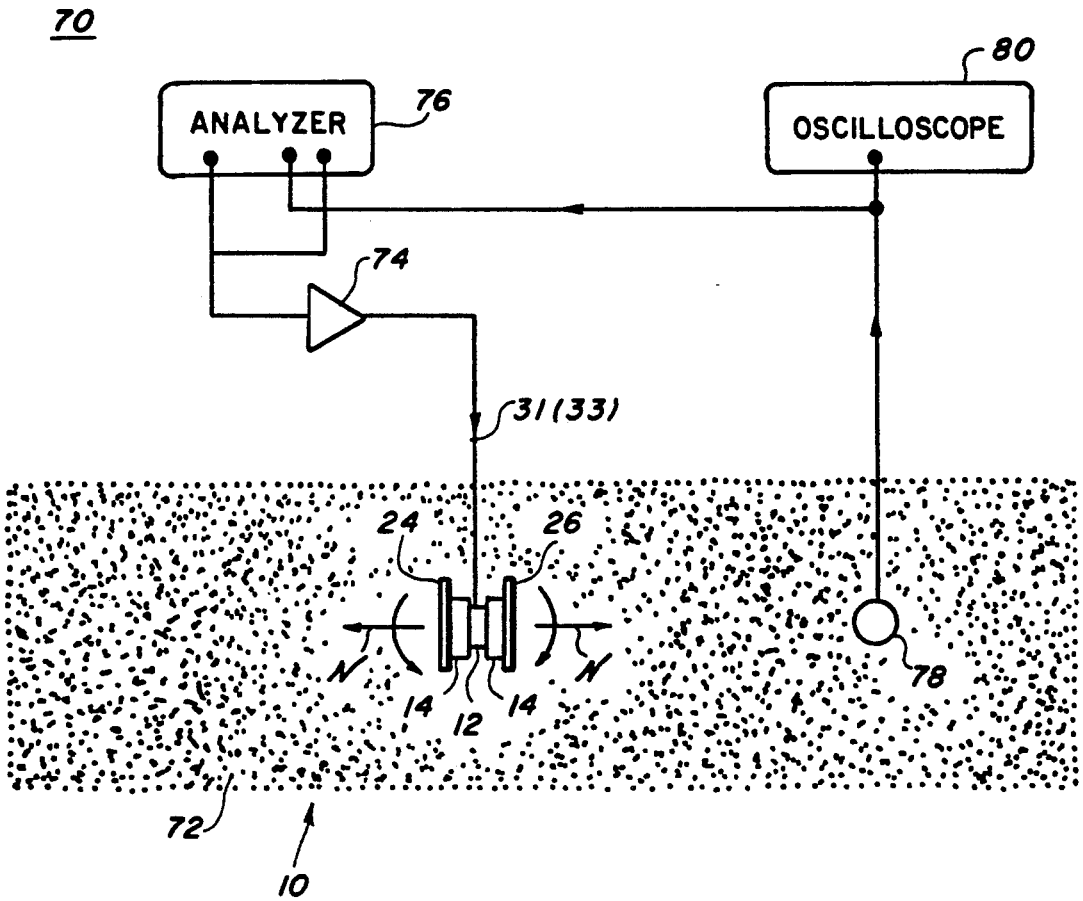
FIG. 7 is a schematic view of a system incorporating the transducer according to the present invention.

FIG. 7 illustrates a system 70 incorporating a transducer 10 according to, e.g., the first embodiment described above, embedded in a substantially solid or solid medium 72, such as ocean sediment. As another example of the medium 72, the transducer 10 could be inserted into a borehole and surrounded by a viscoelastic fluid that supports elastic wave propagation.

In this system 70, the transducer 10 serves to transmit shear waves. The electrical connections or leads 31, 33, extend to an electronic interface means 74, which means 74 is connected to an analyzer 76, such as a Hewlett Packard analyzer. In the transmit mode, the electronic interface 74 is, e.g. an amplifier for generating a driving signal. In the receive mode, the electronic interface 74 is, e.g. a pre-amplifier.

A sensor 78 is also embedded in the sediment 72. The sensor 78 can take the form of the device described in U.S. Pat. No. 4,245,172, issued to Shirley, and entitled, TRANSDUCER FOR GENERATION AND DETECTION OF SHEAR WAVES, the disclosure of which is incorporated herein by reference. Alternatively, the sensor 78 could be another torsional transducer 10 as described above, but operating in a receive mode as described below. This transducer 10 serving as a sensor could be electrically connected to a preamplifier. The sensor 78 is connected to an oscilloscope 80 and to the analyzer 76.

In operation, the analyzer 76 controls the electronic interface means 74 to electrically drive the piezoelectric ceramic arrangement means 14 at relatively low frequencies, e.g., less than 20 kilohertz, via the electrodes 31, 33. When so driven, the piezoelectric ceramic arrangement means 14 are caused to undergo shear movement, which causes torsional movement in the disks 24, 26. This torsional movement is passed through the encapsulant (not shown) and the epoxy shell (not shown), and causes horizontal and vertical shear waves to be formed in the sediment 72. These shear waves N are received by the sensor 78. Upon receiving the shear waves, the sensor 78 signals the oscilloscope 80 and the analyzer 76.

The sensor described in U.S. Pat. No. 4,245,172 can only detect horizontal shear or vertical shear, i.e. single plane shear. As a result, depending upon the application, it may be desired to use two such sensors, one oriented 180 degrees relative to the other.

As noted above, the transducer 10 according to the present invention can also serve to receive shear waves. For example, underwater explosions can create shear waves. When an explosion occurs, the resulting shear waves received by the transducer 10 cause the piezoelectric ceramic arrangement means 14 to experience shear movement (without the need for an electronic interface means 74 for driving the piezoelectric ceramic arrangement means 14 described above). These shear movements cause torsional movement of the transducer 10 in this "receiver" mode that can be detected by the sensor 78, as described above.

The foregoing is considered illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to that fall within the scope of the invention and the appended claims.

What is claimed is:

1. A transducer, comprising:
   (a) a radiating structure having a first and a second end;
   (b) first piezoelectric ceramic arrangement means fixedly connected to the radiating structure, which first means, under the influence of one of shear waves and electrical energy, acts in a shear motion and causes the first end of the radiating structure to move in a first direction; and
   (c) second piezoelectric ceramic arrangement means fixedly connected to the radiating structure, which second means, under the influence of one of shear waves and electrical energy, acts in a shear motion and causes the second end of the radiating structure to move torsionally in a second, opposite direction; and wherein the radiating structure comprises:
   i. a connector having the first end, the second end and an axis,
   ii. a first disk connected to the first end of the connector, perpendicular to the axis of the connector and axially outward of the first piezoelectric arrangement means, and
   iii. a second disk connected to the second end of the connector, perpendicular to the axis of the connector and axially outward of the second piezoelectric arrangement means.

2. The transducer as recited in claim 1, wherein the connector is a tube.

3. The transducer as recited in claim 2, wherein the tube is hollow.

4. The transducer as recited in claim 3, wherein the hollow tube is filled with a soft polymer.

5. The transducer as recited in claim 4, wherein the disks and first and second piezoelectric ceramic arrangement means are covered with a soft polymer.

6. The transducer as recited in claim 5, wherein the soft polymer covering the disks and first and second piezoelectric ceramic arrangement means is covered by an epoxy.

7. The transducer as recited in claim 6, wherein the epoxy is in the shape of a wedge.

8. A system for transmitting and receiving shear waves, comprising:
   (a) a torsional shear wave transducer including first and second piezoelectric ceramic arrangement means, said transducer being located in a substantially solid medium;
   (b) electronic interface means connected to the first and second piezoelectric ceramic arrangement means for electrically driving the first and second piezoelectric ceramic arrangement means;
   (c) an analyzer electrically connected to the electronic interface means;
   (d) a shear wave sensor located in the substantially solid medium;
   (e) an oscilloscope electrically connected between the sensor and the analyzer,
   wherein, when the first and second piezoelectric ceramic arrangement means are driven by the electronic interface means, the first and second piezoelectric ceramic arrangement means experience shear movement, which causes the transducer to undergo torsional movement, causing shear waves in the substantially solid medium, which are detected by the sensor.

9. The system as recited in claim 8, wherein each of the first and second piezoelectric ceramic arrangement means is a solid ring.

10. The system as recited in claim 8, wherein each of the first and second piezoelectric ceramic arrangement means is a plurality of separate radially spaced segments.

11. The system as recited in claim 8, wherein the radiating structure comprises:
 (a) a connector having a first end, a second end and an axis,
 (b) a first disk connected to the first end of the connector, perpendicular to the axis of the connector and axially outward of the first piezoelectric ceramic arrangement means, and
 (c) a second disk connected to the second end of the connector, perpendicular to the axis of the connector and axially outward of the second piezoelectric ceramic arrangement means.

12. The system as recited in claim 11, wherein the connector is a tube.

13. The system as recited in claim 12, wherein the tube is hollow.

14. The system as recited in claim 13, wherein the hollow tube is filled with a soft polymer.

15. The system as recited in claim 14, wherein the disks and first and second piezoelectric ceramic arrangement means are covered with a soft polymer.

16. The system as recited in claim 15, wherein the soft polymer covering the disks and first and second piezoelectric ceramic arrangement means is covered by an epoxy.

17. The system as recited in claim 16, wherein the epoxy is in the shape of a wedge.

18. The system as recited in claim 8, wherein the radiating structure is made of 50% glass reinforced polycarbonate.

19. The system as recited in claim 8, wherein the first and second piezoelectric ceramic arrangement means are made of lead zirconate titanate.

20. The system as recited in claim 8, wherein the electronic interface means operates in a frequency range up to 20 kilohertz.

21. A system for detecting shear waves, comprising:
 (a) a torsional shear wave transducer including first and second piezoelectric ceramic arrangement means, said transducer being located in a substantially solid medium;
 (b) a shear wave sensor located in the substantially solid medium,
 wherein, when the first and second piezoelectric ceramic arrangement means experience shear movement this causes the transducer to undergo torsional movement, creating shear waves in the substantially solid medium, which are detected by the sensor.

22. The system as recited in claim 21, wherein the sensor is a second torsional shear wave transducer.

* * * * *